United States Patent [19]

Martin

[11] Patent Number: 4,494,239

[45] Date of Patent: Jan. 15, 1985

[54] FRAME SYNCHRONIZATION AND PHASE AMBIGUITY RESOLUTION IN QAM TRANSMISSION SYSTEMS

[75] Inventor: Gary D. Martin, Andover, Mass.

[73] Assignee: AT&T Bell Laboratories, Murray Hill, N.J.

[21] Appl. No.: 382,176

[22] Filed: May 26, 1982

[51] Int. Cl.³ .................. H03C 5/00; H04B 15/00
[52] U.S. Cl. .................................. 375/39; 375/58; 370/20
[58] Field of Search .................. 375/39, 42, 43, 53, 375/54, 57, 58, 60, 79, 99, 102; 370/20, 29; 332/17, 18; 455/60; 328/162, 163

[56] References Cited

U.S. PATENT DOCUMENTS

| | | | |
|---|---|---|---|
| 3,341,776 | 9/1967 | Dozlz et al. | 375/39 |
| 3,736,507 | 5/1973 | Wolejsza, Jr. et al. | 375/54 |
| 3,955,141 | 5/1976 | Lyon et al. | 375/39 |
| 3,988,539 | 10/1976 | Motley et al. | 375/39 |
| 4,347,616 | 8/1982 | Murakami | 375/39 |

OTHER PUBLICATIONS

Cacciaman et al., IEEE Trans. on Comm. Tech., vol. COM-19, No. 6, Dec. 1971, "Phase Ambiguity Resolution in a Four-Phase PSK Communications System".

Primary Examiner—Robert L. Griffin
Assistant Examiner—Stephen Chin
Attorney, Agent, or Firm—David R. Padnes; John K. Mullarney

[57] ABSTRACT

A technique for maintaining frame synchronization in a OAM system transmitting nondifferentially encoded data is disclosed. In accordance with the present invention, multibit words ($F_I$, $F_Q$) comprising framing bits are formed and inserted into the transmitter data channels. The value of the framing bit is insensitive to the rotational effects of phase ambiguity by having a predetermined value and by being inserted within a predetermined bit position in each data channel. In the disclosed embodiments, regeneration errors can also be corrected by the transmission of predetermined quadrant bits within the multibit words. In addition, the spectral tones generated by multibit word transmission can be reduced by the use of utility bits in the multibit words.

16 Claims, 9 Drawing Figures

FIG. 3

| | | | | Q | | | | |
|---|---|---|---|---|---|---|---|---|
| 100000 | 100001 | 100011 | 100010 | 100110 | 100111 | 100101 | 100100 |
| 101000 | 101001 | 101011 | 101010 | 101110 | 101111 | 101101 | 101100 |
| 111000 | 111001 | 111011 | 111010 | 111110 | 111111 | 111101 | 111100 |
| 110000 | 110001 | 110011 | 110010 | 110110 | 110111 | 110101 | 110100 |
| 010000 | 010001 | 010011 | 010010 | 010110 | 010111 | 010101 | 010100 |
| 011000 | 011001 | 011011 | 011010 | 011110 | 011111 | 011101 | 011100 |
| 001000 | 001001 | 001011 | 001010 | 001110 | 001111 | 001101 | 001100 |
| 000000 | 000001 | 000011 | 000010 | 000110 | 000111 | 000101 | 000100 |

(Horizontal axis: I; Vertical axis: Q)

FIG. 4 VALUE OF BITS 2 & 5 IN FIG. 3

FIG. 5 VALUE OF BITS 3 & 6 IN FIG. 3

FRAME SYNCHRONIZATION AND PHASE AMBIGUITY RESOLUTION IN QAM TRANSMISSION SYSTEMS

TECHNICAL FIELD

The present invention relates to digital transmission systems and, more particularly, to a technique for maintaining frame synchronization and resolving regeneration errors in QAM transmission systems caused by phase ambiguity.

BACKGROUND OF THE INVENTION

A convenient modulation arrangement for high speed digital transmission systems known as quadrature amplitude modulation or QAM involves modulating the amplitudes of quadrature-related carriers with digital data channels. Quadrature-related carriers are carriers of the same frequency having a phase angle therebetween of 90 degrees. After amplitude modulation, the carriers are added and the resulting sum is transmitted through a suitable transmission medium. At the receiver, the incoming signal is demodulated by regenerating the carrier and synchronously detecting the incoming signal with the regenerated carrier.

QAM modulation defines a group of signal data points on a two-dimensional signal space diagram having four quadrants. The four quadrants are defined by an inphase or I axis and a quadrature phase or Q axis. The number of signal points in each quadrant is a function of the number of amplitude levels for each modulated carrier.

A problem occurring in QAM transmission systems is phase ambiguity in the regenerated carrier. Phase ambiguity arises when the regenerated carrier skips to a different stable phase relative to the transmitted carrier and can result in a loss of frame synchronization and incorrectly regenerated data bits. Referring to the signal space diagram, the presence of phase ambiguity results in a rotation of the data points by a multiple of a whole quadrant. Accordingly, during phase ambiguity, any transmitted data point in one quadrant will be regenerated as a corresponding data point within one of the three other quadrants.

A prior art technique to resolve phase ambiguity involves the use of differentially encoded data. While differential encoding allows system operation without an absolute carrier reference phase, the bit error rate performance can be worse than that obtainable with nondifferential data encoding. In fact, for many QAM system applications, the degraded bit error rate performance resulting from differential encoding does not meet performance objectives. Furthermore, this unsatisfactory bit error rate can not be significantly improved using easily implementable error correction techniques because of the burst of bit errors resulting from a single transmission error.

Another technique to resolve phase ambiguity in phase shift keying (PSK) satellite systems, as disclosed in U.S. Pat. No. 3,736,507 to Wolejsza, Jr. et al, issued May 29, 1973, involves the transmission of a repetitive, fixed word at the beginning of each transmission burst. This scheme, however, is not suited for some QAM systems, especially terrestrial systems which continuously transmit data, because it can generate spectral tones with high power levels.

SUMMARY OF THE INVENTION

The present invention addresses the problem of phase ambiguity in QAM transmission systems using nondifferentially encoded data. In accordance with the present invention, multibit words comprising framing bits are formed and inserted into the digital data channels to designate a frame of data. The value of each framing bit is insensitive to the rotational effects of phase ambiguity by having a predetermined value and by being inserted into a predetermined bit position in each channel. Hence, frame synchronization is maintained during phase ambiguity. Preferably, the multibit words also comprise utility bits which are varied so as to reduce the power of the spectral tones generated by a repetitive transmission of the multibit words. With frame synchronization maintained, regeneration errors at the receiver caused by phase ambiguity can also be corrected by the transmission of quadrant bits. Such quadrant bits can be inserted within all of the multibit words. Preferably, however, the quadrant bits are inserted into the data channels as part of every M multibit word, where M is an integer greater than one, by substitution of a quadrant bit for a utility bit or a framing bit.

DESCRIPTION OF THE DRAWING

Figure 1:
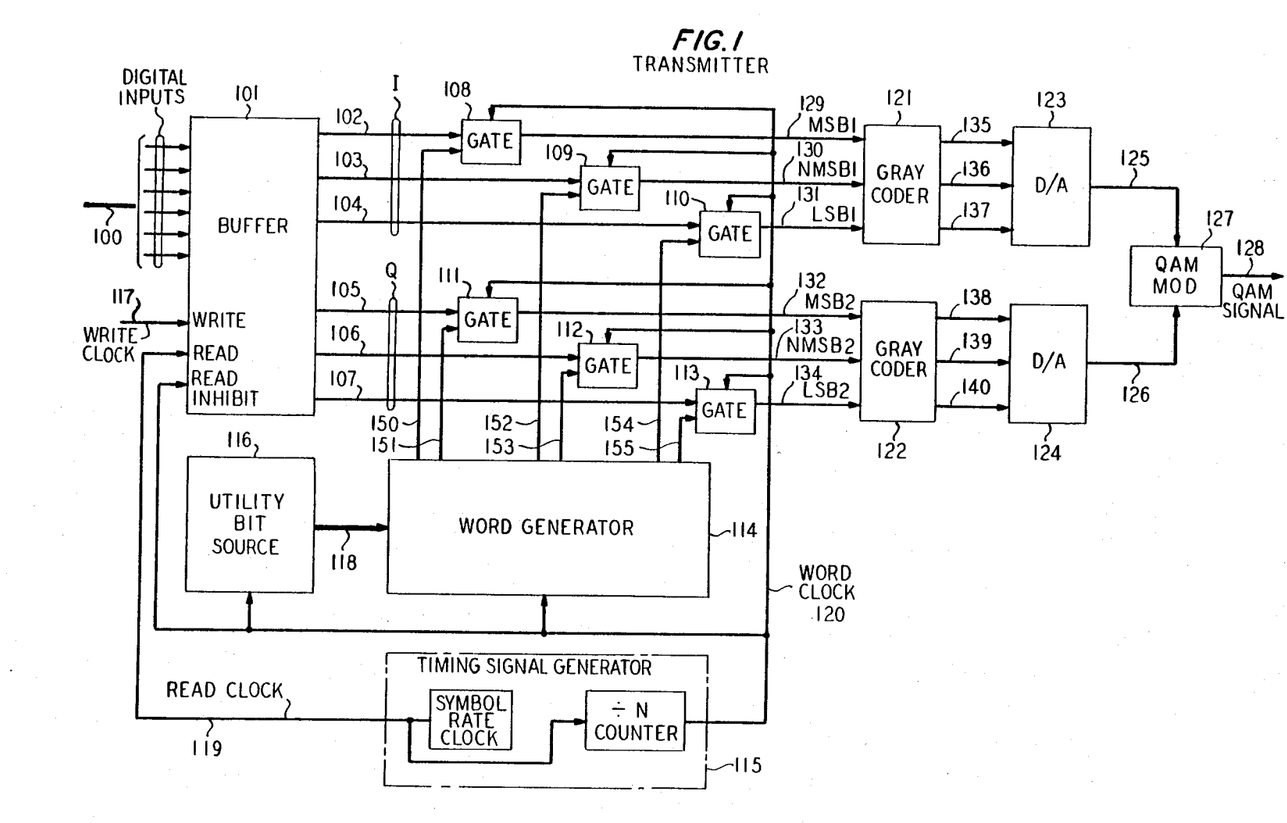
FIG. 1 is a block-schematic diagram of a QAM transmitter in accordance with the present invention.
Figure 2:
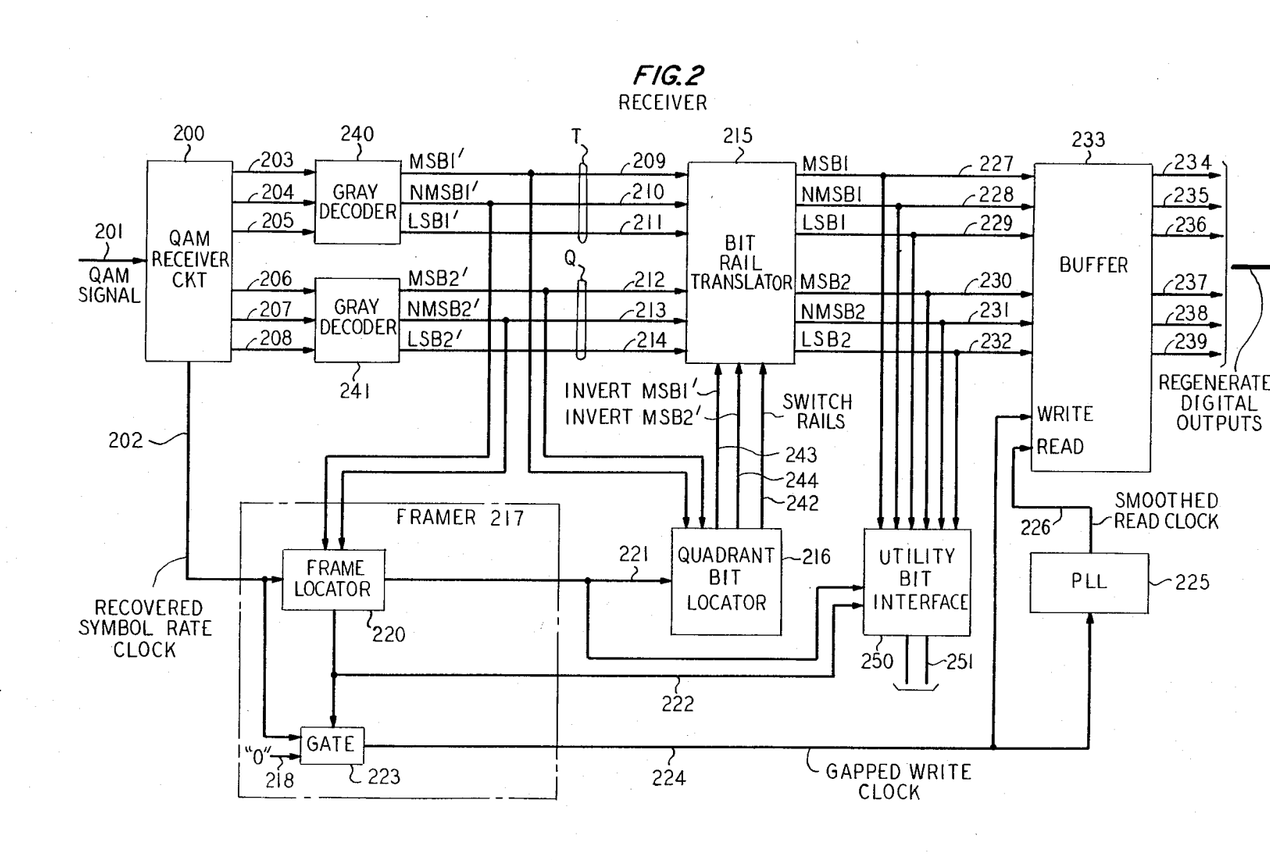
FIG. 2 is a block-schematic diagram of a QAM receiver in accordance with the present invention.

FIGS. 1 and 2 respectively are an illustrative high-speed 64 QAM transmitter and receiver which have been modified to incorporate the present invention. In the transmitter, synchronous digital input signals on the six leads comprising bus 100 are written into buffer 101 using a write clock on lead 117. The write clock is at the input signal rate. Preferably, the digital input signals are also scrambled signals. For example, three DS-3 digital lines can be each supplied to conventional circuitry (not shown), comprising a scrambler and serial to parallel converter, to form two of the digital input signals. Of course, in other applications, asynchronous signals can be utilized by converting them to synchronous signals in well-known fashion.

The six digital bits written into buffer 101 at any one time are read-out onto leads 102, 103, 104, 105, 106 and 107 in response to a read clock on lead 119. This read clock, produced by a clock source within timing signal generator 115, is at the symbol rate of the QAM signal on output lead 128. As will be discussed, infra, the QAM symbol rate is slightly higher than the line rate of the digital input signals because of the periodic insertion of multibit words from word generator 114 onto leads 129 through 134. The multibit words are used to maintain frame synchronization during the presence of phase ambiguity and can also be used to resolve phase ambiguity induced digital signal regeneration errors in the receiver.

Leads 129, 130 and 131 respectively represent the most significant bit (MSB1), next-to-most significant bit (NMSB1), and least significant bit (LSB1) components of the in-phase (I) rail or channel. Similarly, leads 132, 133 and 134 respectively conduct the MSB2, NMSB2 and LSB2 components of the quadrature (Q) channel. The I and Q channel bits on leads 102 through 107 are coupled through gates 108–113 to leads 129–134 and thence to gray coders 121 and 122. Gray-coders 121 and 122 are preferably used so as to minimize the bit-error rate performance of the QAM transmission system. Coder output leads 135–140 supply the Gray-coded digital bits to digital-to-analog (D/A) converters 123 and 124. Each D/A converter generates an analog signal from the digital bits in each channel. These analog signals appear on leads 125 and 126 and are supplied to QAM modulator 127. Within modulator 127, each analog signal independently modulates the amplitude of one of the quadrature-related carriers. The amplitude modulated carriers are then linearly added to form a QAM signal on lead 128 which can be transmitted through any suitable transmission medium.

In addition to the read clock, timing signal generator 115 also produces a word clock on lead 120 which is supplied to buffer 101, word generator 114, utility bit source 116 and gates 108 through 113. The word clock is generated by dividing the read clock pulse at the QAM symbol rate on lead 119 by N. N is a large integer representing the number of digital signals on leads 102 through 107 within a system frame divided by 6. In the system application wherein the digital input signals are from three DS-3 digital lines, the system frame would typically be a multiple number of DS-3 frames. Each word clock pulse inhibits the read out from buffer 101, forms multibit words $F_I$ and $F_Q$ on leads 150 through 155 of generator 114, inserts $F_I$ via gates 108 through 110 onto the I channel and inserts $F_Q$ via gates 111 through 113 into the Q channel. Leads 150, 152 and 154 each conduct one bit of word $F_I$ and leads 151, 153 and 155 each conduct one bit of word $F_Q$.

To maintain frame synchronization during the presence of phase ambiguity, words $F_I$ and $F_Q$ periodically comprise at least one framing bit along with utility bits. The utility bits are supplied from utility bit source 116 via bus 118 in response to each word clock pulse on lead 120. The values of the utility bits from source 116 are also advantageously varied to reduce the power of the spectral tones generated by the repetitive transmission of multibit words $F_I$ and $F_Q$ every system frame. A reduction in spectral tone power improves transmission system performance. In addition, such variations allow the attainment of prescribed spectral tone power levels required in certain terrestrial QAM system applications.

A variety of circuits can be used for source 116. In one application, source 116 can be a buffer which stores the digital output of service channels. Service channels are used in digital transmission systems to provide different kinds of auxiliary information. For example, this information can be encoded voice signals between personnel at the transmitter and receiver or can be parity bits for insertion into the I and Q channels to implement a number of well-known error correction techniques. In the alternative, source 116 can be a random or pseudo-random number generator, or the like, and the utility bits the output of the number generator.

Figure 3:
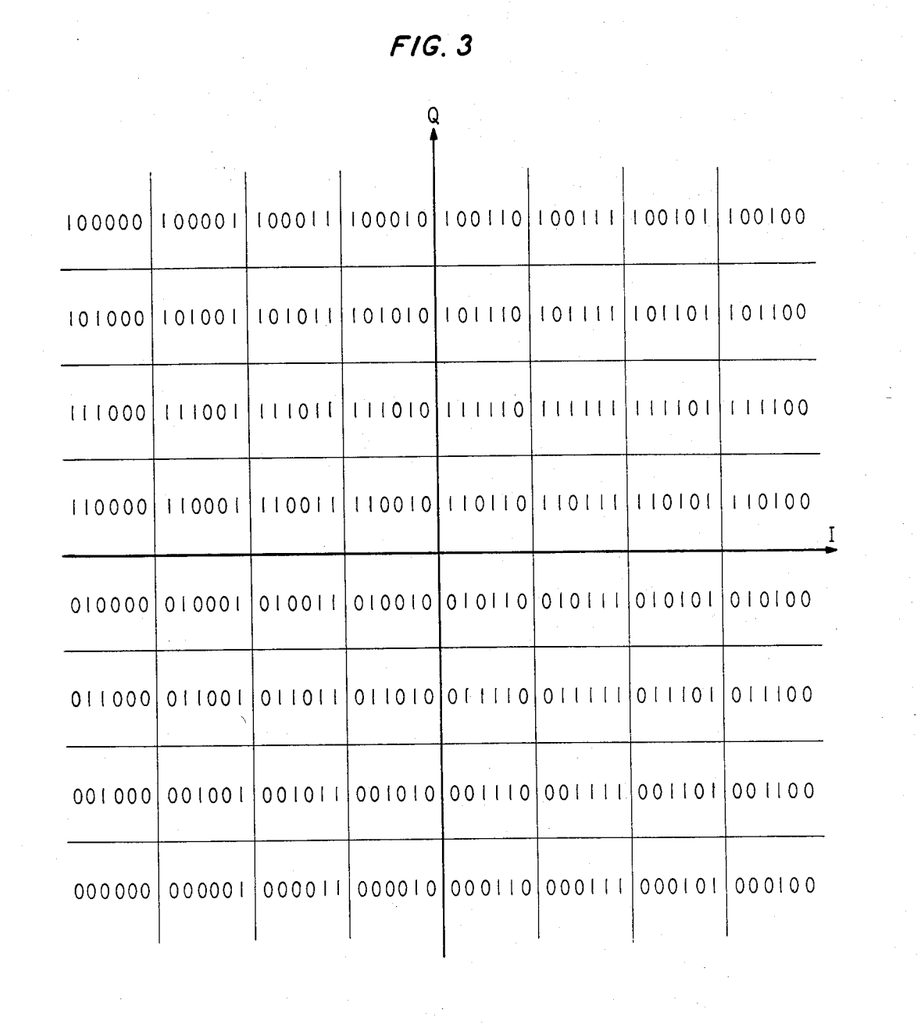
FIG. 3 is an illustrative Gray code for a 64 QAM digital transmission system.
Figure 4:
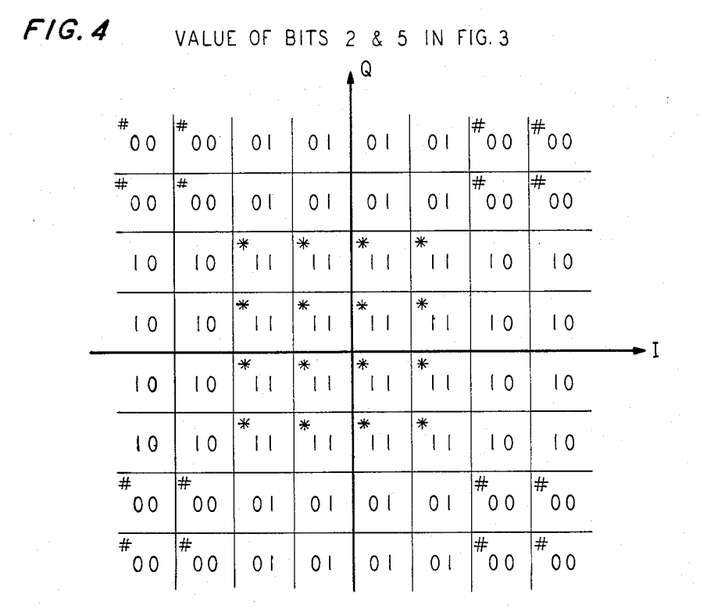
FIG. 4 illustrates the values of bits 2 and 5 in the Gray code of FIG. 3.
Figure 5:
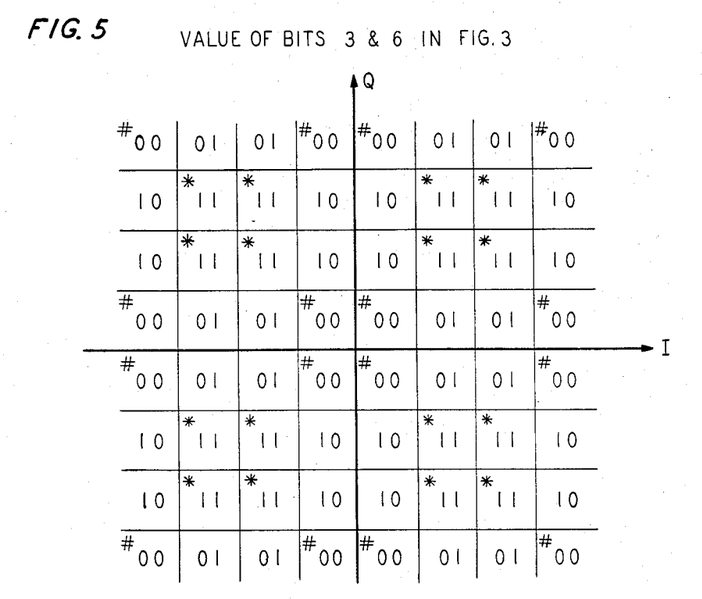
FIG. 5 illustrates the values of bits 3 and 6 in the Gray code of FIG. 3.

The framing bits within words $F_I$ and $F_Q$ are insensitive to the presence of phase ambiguity by having predetermined values and positions when inserted into the I and Q channels. In FIG. 1, these positions correspond to the NMSB1 and NMSB2 components or the LSB1 and LSB2 components of the I and Q channels. To understand how the NMSB1 and NMSB2 or LSB1 and LSB2 components are insensitive to phase ambiguity, refer now to FIG. 3. FIG. 3 shows a typical Gray code for 64 QAM transmission. Each box represents a code state or signal data point. In a Gray code, the six bits associated with each 64 QAM state are chosen so that all adjacent states differ in only one bit. Gray coding is preferably used in QAM systems using nondifferentially encoded data since it minimizes the bit error rate. In FIG. 3, the first and fourth bits within each box, counting from left to right, are the most significant bit components of the I and Q channels designated as MSB1 and MSB2. MSB1 and MSB2 determine the quadrant in which a code state lies. Bits 2 and 5 are NMSB1 and NMSB2 and bits 3 and 6 are LSB1 and LSB2, respectively. NMSB1, NMSB2, LSB1 and LSB2 determine the intra-quadrant position. FIG. 4 represents the values of NMSB1 and NMSB2 for the 64 code states of FIG. 3. Similarly, FIG. 5 represents the values of LSB1 and LSB2 for the 64 code states of FIG. 3. An examination of FIG. 4 reveals that there are two symmetrical subsets of NMSB1 and NMSB2, one designated by an asterisk (*) and the other by a number sign (#), which have the same bit value in all four quadrants. The bit values associated with these subsets will be assigned to the framing bits within $F_I$ and $F_Q$. If these framing bits are inserted into the NMSB1 and NMSB2 bit components of the I and Q channels, a 90° or multiple of 90° rotation of the transmitted word resulting from phase ambiguity does not effect the value of the framing bit regenerated at the receiver. Hence, framing synchronization is maintained during phase ambiguity. Referring to FIG. 5, there are also two symmetrical subsets of LSB1 and LSB2, one designated by an asterisk and the other by a number sign, which also have the same bit value in all four quadrants. Therefore, frame synchronization will also be maintained if these bit values are assigned to framing bits which are inserted into the LSB1 and LSB2 components of the I and Q channels. Moreover, the bit values within the subsets of FIGS. 4 and 5 can be used for the framing bits within $F_I$ and $F_Q$ by inserting the framing bits within NMSB1 and NMSB2 at certain times and inserting the framing bits within LSB1 and LSB2 at other times.

With the framing bits as a reference, the errors in regenerating the transmitted data can also be corrected by the transmission of quadrant bits having preassigned values. These quadrants bits are inserted into the MSB1 and MSB2 components of the I and Q channels. To reduce spectral tone power levels, the quadrant bits are preferably not transmitted as part of every multibit word $F_I$ and $F_Q$. Instead, they are transmitted as part of every $M^{th}$ $F_I$ and $F_Q$ words, where M is an integer greater than one, by substitution of a quadrant bit for a utility bit or a framing bit.

In order for the receiver to locate the quadrant bits every $M^{th}$ $F_I$ and $F_Q$ words, the framing bits must form a repetitive pattern of length M (or a multiple of M). For example, with the Gray code of FIG. 3, the framing bits in $F_I$ and $F_Q$ could both be logical "0" every $M^{th}$ multibit word time, and both logical "1" otherwise. The reception of logical "0" framing bits in the I and Q channels would then signal the receiver that the MSB1 and MSB2 components of the next multibit words are quadrant bits.

Refer now to FIG. 2. The incoming QAM signal on lead 201 is coupled to QAM receiver circuit 200. Within receiver circuit 200, the QAM signal is demodulated into two analog signals which are sampled and decoded into the Gray-coded bit components of the I and Q channels. The I bit components appear on leads 203 through 205 and the Q components appear on leads 206 through 208. The QAM symbol rate clock is also recovered within receiver circuit 200 and coupled via 202 to frame locator 220 within framer 217. Gray decoders 240 and 241 respectively decode the digital information provided by receiver circuit 200 to generate MSB1', NMSB1' and LSB1' on leads 209 through 211 and MSB2', NMSB2' and LSB2' on leads 212 through 214.

The prime designation following each one of the bit components of the received I and Q channels is to indicate that these components may not be identical to their respective counterparts in the transmitter due to the presence of phase ambiguity.

Framer 217 comprises frame locator 220 and gate 223. Locator 220, clocked by the recovered symbol rate clock on lead 202, examines leads 210 and 213 to recover framing. For purposes of illustration, it has been assumed that the framing bits within $F_I$ and $F_Q$ were inserted into the NMSB1 and NMSB2 components of the I and Q channels. As was described above, if the quadrant bits are transmitted as part of every $M^{th}$ $F_I$ and $F_Q$ words, the values chosen for the framing bits should form a repetitive pattern which the receiver can use to locate the quadrant bits. Frame locator 220 searches for symbol times N symbols apart at which the repetitive framing bit pattern appears. When such symbol times are found, locator 220 generates a logical "1" signal on lead 222 every N symbols to indicate the multibit word times. This logical "1" signal enables utility bit interface 250 to extract and store the utility bits within words $F_I$ and $F_Q$. The logical "1" signal on lead 222 also causes gate 223 to couple the logical "0" signal on lead 218 to lead 224. When lead 222 is at logical "0", gate 223 couples the recovered symbol rate clock to lead 224. Consequently, a gapped write clock is produced on lead 224 having pulses at the times of the recovered symbol rate clock pulses and no pulses at the multibit word times.

At the quadrant bit times, locator 220 also generates a logical "1" signal on lead 221 which is the timing source for quadrant bit locator 216. Lead 221 is also supplied to interface 250, since the utility bits are either deleted or appear on different leads at the times $F_I$ and $F_Q$ comprise quadrant bits.

The errors in digital signal regeneration within the receiver due to phase ambiguity are corrected by quadrant bit locator 216 and bit rail translator 215. Quadrant bit locator 216 examines the MSB1' and MSB2' bit components on leads 209 and 212 upon receiving a pulse on lead 221. Depending on the logical levels of the quadrant bits found, quadrant bit locator 216 produces logical signals on leads 242, 243 and 244 which control the operation of bit rail translator 215. A logical "1" signal on leads 243 and 244 respectively cause the MSB1' and MSB2' components to be inverted. Inversion of MSB1' and/or MSB2' may be required depending on the amount of rotation due to phase ambiguity. A logical "1" signal on lead 242 causes translator 215 to switch the corresponding bit components of the I and Q channels. This rail switching is required, at times, after inversion of the MSB1' or MSB2' bit components. The corrected bit components, MSB1, NMSB1 and LSB1, of the I channel appear on leads 227 through 229 and the corrected bit components of the Q channel, MSB2, NMSB2 and LSB2, appear on leads 230 through 232.

Buffer 233 writes in the digital signals on leads 227 through 232 under the control of the gapped write clock on lead 224. Since there are no gapped write clock pulses at the multibit word time, the multibit words are never written into buffer 233. Phase lock loop (PLL) 225 averages the gapped write clock on lead 224 and generates a "smoothed" read clock therefrom on lead 226 which reads out the contents of buffer 233 onto leads 234 through 239.

In applications where $F_I$ and $F_Q$ comprise utility bits representing service channel information, such information can be extracted through the use of utility bit interface 250. Interface 250, comprising a buffer, stores the utility bits at the multibit word time via the logical "1" signals on lead 222. The logical "1" signal on lead 221 inhibits the buffer within interface 250 from storing the quadrant bits on leads 227 and 230. In addition, for the case where framing bits are replaced by utility bits when quadrant bits are inserted in $F_I$ and $F_Q$, the logical "1" signal on lead 221 can be supplied to a multiplexer in interface 250 so as to gate these utility bits into the buffer within interface 250. Interface 250 is shown generically coupled to leads 227 through 232. Of course, in applications where certain leads in the I and Q channel comprise only framing or quadrant bits at the multibit word time, such leads need not be coupled to interface 250. The utility bits stored can subsequently read out onto leads 251 in response to a clock signal (not shown) coupled to interface 250.

Figure 6:
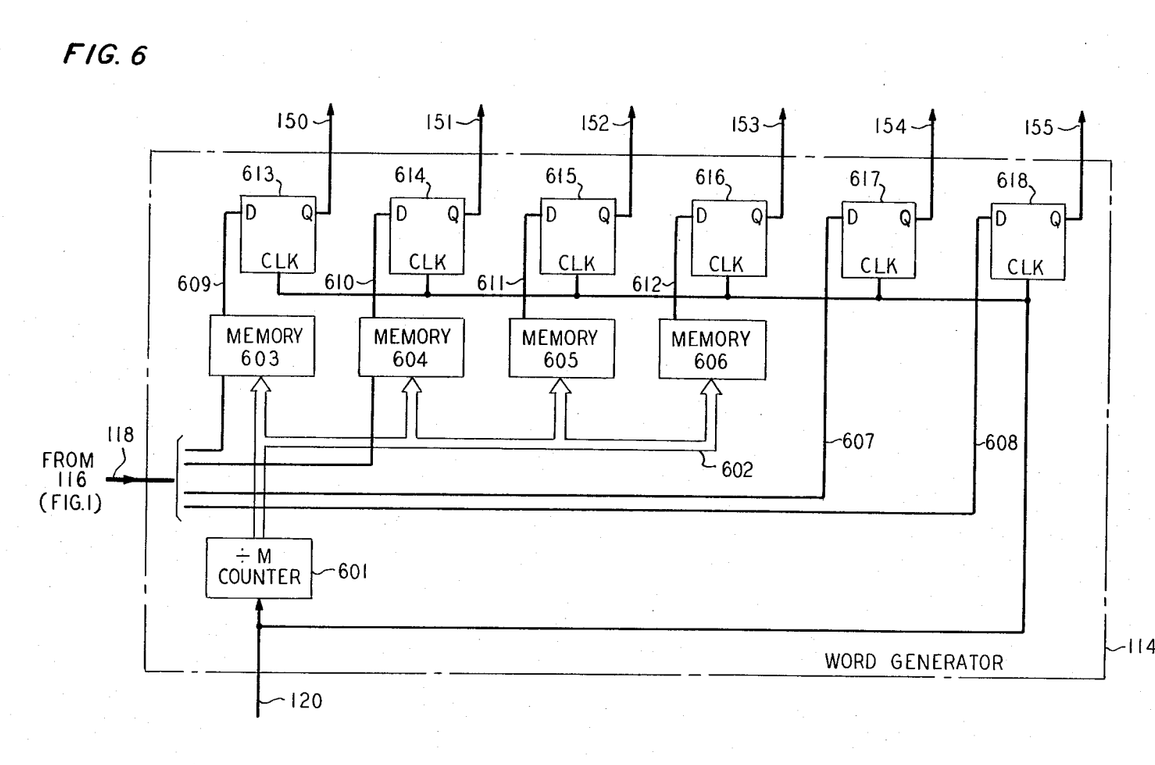
FIG. 6 is a schematic diagram of the word generator of FIG. 1 pursuant to a first embodiment of the present invention.
Figure 7:
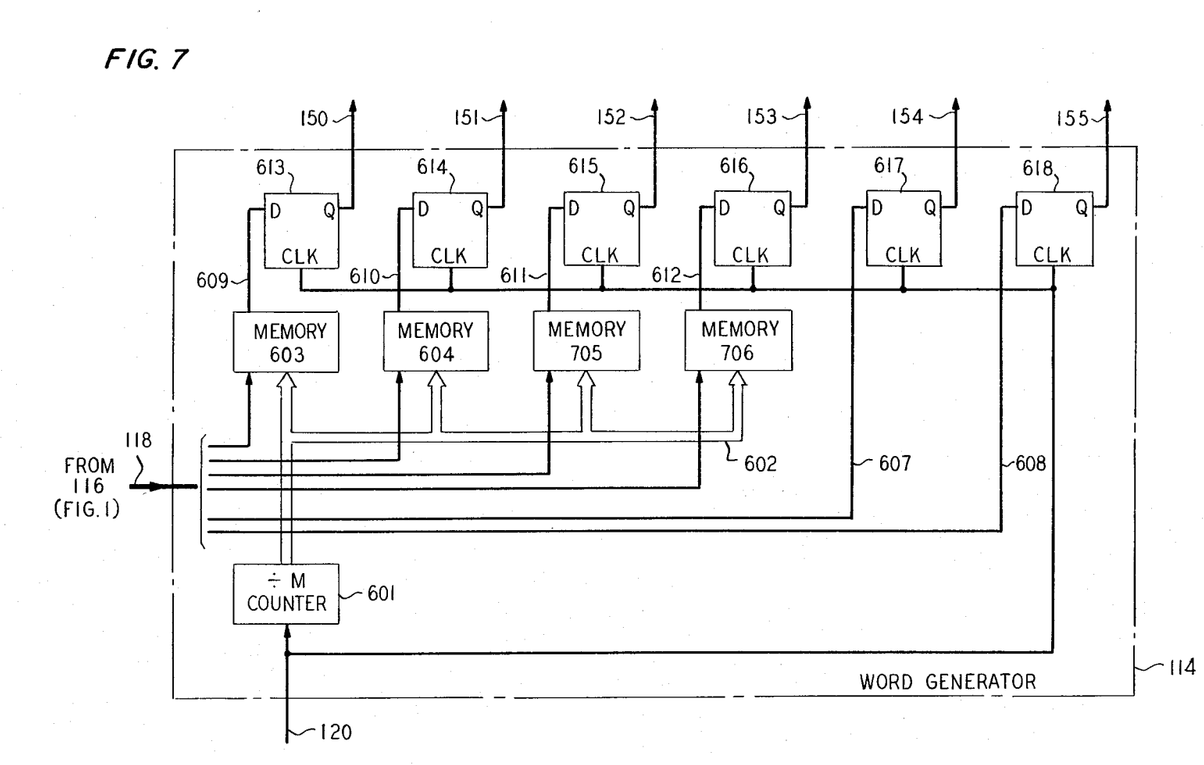
FIG. 7 is a schematic diagram of the word generator of FIG. 1 pursuant to a second embodiment of the present invention.

Two illustrative implementations of word generator 114 are shown in FIGS. 6 and 7. In both implementations, the word generator produces multibit words comprising framing and utility bits. In addition, each word generator periodically inserts quadrant bits in lieu of utility bits to correct phase ambiguity induced regeneration errors. In FIG. 6, the framing bits remain at the time of quadrant bit insertion while in FIG. 7 the framing bits are deleted and replaced by utility bits at the time of quadrant bit insertion.

Referring to FIG. 6, divide by M counter 601, where M is an integer greater than 1, is clocked by word clock pulses on lead 120. Counter 601 increments its count, outputted as a digital word on bus 602, in response to each word clock pulse. Once the maximum count of M is reached, the counter resets and begins counting again. Memories 605 and 606 store the framing bits for $F_I$ and $F_Q$, respectively. While two memories are used to store framing bits, one memory is often sufficient. This is true for the symmetrical subsets of FIGS. 3 and 4 since the framing bits in $F_I$ and $F_Q$ have the same value at the same time. Each framing bit, stored in a different one of M addresses, is read out in response to the address provided on bus 602. The framing bit for $F_I$, formed on lead 611, is delayed by flip-flop 615 before appearing on lead 152. This framing bit becomes the NMSB1 component of the I channel via gate 109 on the next word clock pulse. Similarly, the framing bit for $F_Q$, formed on lead 612, is delayed by flip-flop 616 before appearing on lead 153. The framing bit for $F_Q$ becomes the NMSB2 component of the Q channel via gate 112 on the next work clock pulse. In addition, in response to each word clock pulse, utility bit source 116 supplies a varying set of four utility bits on bus 118. Each of the four utility bits appear on a different one of the four bus 118 leads. The bits on two of the four leads are merely delayed by flip-flops 617 and 618 before appearing on leads 154 and 155. Of the remaining two leads, one is coupled along with bus 602 to supply address information to memory 603 and one is coupled along with bus 602 to supply address information to memory 604. Memories 603 and 604 each comprise at least two M addresses and provide logical "0" or "1" bit values on leads 609 and 610. For addresses corresponding to M−1 of the values on bus 602, the logical level on lead 609 corresponds to the logic level of the utility bit on the lead of bus 118 forming part of the address for memory 603. For these same M−1 values of bus 602, the logic level on lead 610 corresponds to the logic level on the lead of bus 118 forming part of the address for memory 604. In addition, once per M addresses, memories 603 and 604 read out logic "1" quadrant bits on leads 609 and 610 regardless of the logic levels of the utility bits forming part of each memory address. Of course, if a quadrant bit is desired within each $F_I$ and $F_Q$, memories 603 and 604, each storing predetermined quadrant bits, can be addressed in the same manner as memories 605 and 606. Accordingly, each word clock pulse forms the next $F_I$ on leads 609, 611 and 607 and the next $F_Q$ on leads 610, 612 and 608. At each word clock pulse, gates 108, 109 and 110 insert the present $F_I$ into the I channel and gates 111, 112 and 113 insert the present $F_Q$ into the Q channel.

FIG. 7 also provides $F_I$ and $F_Q$ on the same leads as in FIG. 6 for each word clock pulse. FIG. 7 comprises divide by M counter 601, bus 602, flip-flops 613 through 618, and memories 603 and 604 which function in an identical manner to that described in reference to FIG. 6. In FIG. 7, however, bus 118 comprises six leads. Memories 705 and 706 are each addressed by bus 602 and one lead of bus 118. For M−1 addresses, memories 705 and 706 each provide a framing bit onto leads 611 and 612. In addition, for the one out of M addresses that memories 603 and 604 provide quadrant bits, memories 705 and 706 each provide a utility bit having a logical value equal to the logical level on the lead of bus 118 forming part of the memory address. Hence, in the word generator of FIG. 7, the framing bits are deleted and replaced by a utility bit at the quadrant bit time.

The above-described implementations of word generator 114 can, of course, be readily varied to provide framing bit appearances on the LSB1 and LSB2 components of the I and Q channels. In addition, a variety of framing bit patterns can be readily accomplished by merely changing the stored values within memories 605 and 606 or 705 and 706. For the illustrative 64 QAM coding, the values of framing bits inserted into the I and Q channels at the same time should correspond to the values within any one of the referenced subsets within FIGS. 4 or 5. It should also be understood that the present invention is not limited to nondifferential Gray-coded data but can be used with any code point pattern forming at least one symmetric subset wherein predetermined bit positions do not vary in value due to phase ambiguity.

Figure 8:
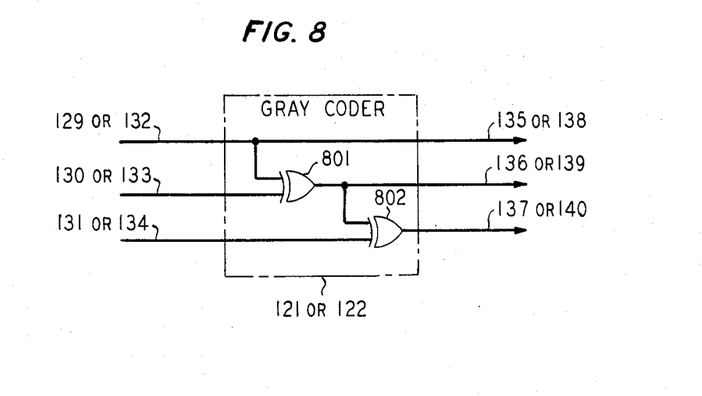
FIG. 8 is a schematic diagram of a Gray coder for use in FIG. 1.

FIG. 8 shows a schematic of Gray-coders 121 or 122 comprising cascaded Exclusive-OR gates 801 and 802. Gray-decoders 240 and 241, used in the receiver of FIG. 2, are substantially identical in structure with only the lead designations being changed to the corresponding receiver designations.

Figure 9:
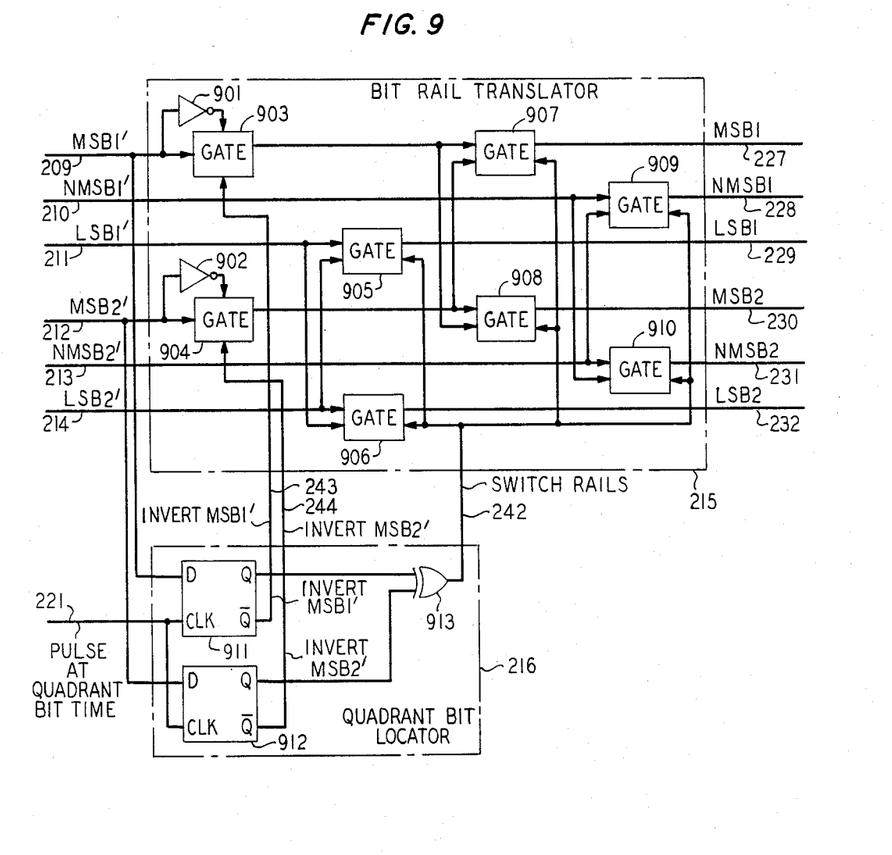
FIG. 9 is a schematic diagram of the quadrant bit locator and bit rail translator of FIG. 2.

FIG. 9 illustrates the detailed circuitry within bit rail translator 215 and quadrant bit locator 216. The D inputs of flip-flops 911 and 912 are respectively connected to the MSB1' and MSB2' components of the I and Q channels. By coupling the quadrant bit pulse on lead 221 to the clock (CLK) inputs of flip-flops 911 and 912, the regenerated quadrant bits will appear on the Q output leads. These leads are coupled to Exclusive-OR gate 913. Consider the case of two transmitted logical "1" quadrant bits. In the absence of phase ambiguity, the Q outputs of flip-flops 911 and 912 are both logical "1's" and no corrective action is necessary. In the presence of phase ambiguity, however, the regenerated bits on leads 209 through 214 correspond to a rotation of the transmitted bits by one or more quadrants.

Referring to FIG. 3, if phase ambiguity causes a 90° counterclockwise rotation of the regenerated data, the Q output of flip-flop 911 is logical "1" and the Q output of flip-flop 912 is logical "0". The logical "1" $\overline{Q}$ output of flip-flop 912 is coupled via lead 244 to gate 904. Upon receiving a logical "1" signal, gate 904 inverts the MSB2' component by coupling the output of inverter 902. In addition, the logical "1" output of gate 913 is coupled to gates 905, 906, 907, 908, 909 and 910 which then switch the corresponding bit components of the I and Q channels. For 180° counterclockwise rotation of the regenerated data, the Q outputs of flip-flops 911 and 912 are both logical "0's". The logical "1" $\overline{Q}$ outputs are coupled via leads 243 and 244 to gates 903 and 904. Gates 903 and 904 invert the MSB1' and MSB2' components by coupling the outputs of inverters 901 and 902. Finally, for 270° counterclockwise rotation of the regenerated data, the Q outputs of flip-flops 911 and 912 are logical "0" and "1", respectively. The logical level on the $\overline{Q}$ output of flip-flop 911 causes gate 903 to invert MSB1' which is then followed by switching of the corresponding bit components of the I and Q channels in response to the logical "1" output of Exclusive-OR gate 913. Accordingly, the above-described operation of quadrant bit locator 216 and bit rail translator 215 will correct phase ambiguity induced regeneration errors. The corrected bit components, designated as MSB1, NMSB1, LSB1, MSB2, NMSB2 and LSB2 appear on leads 227 through 232.

While the operation of the present invention has been discussed in reference to a transmitter and receiver having two data channels, it should be understood that the present invention is adaptable for use in QAM systems having a greater number of data channels. For example, the QAM system could conceivably comprise four data channels which are selectably coupled two at a time to QAM modulator 127. Further variations of the described invention are also readily apparent. For example, in QAM systems having a large number of amplitude levels, it may be desirable to form more than one framing bit per word. This can be readily accomplished, for example, by coupling the framing bits read out to more than one bit component in the data channels. Or, for example, the values of the quadrant bits transmitted can be varied in some predetermined manner.

What is claimed is:
1. Apparatus for use in a QAM system wherein at least two channels of nondifferentially encoded data modulate the amplitudes of quadrature-related carriers, said data being sensitive to rotational effects of phase ambiguity, said apparatus being characterized by means (114, 115) for forming multibit words ($F_I, F_Q$) each comprising at least one framing bit having a predetermined value, and means (115, 108, 109, 110, 111, 112, 113) for inserting said words at selected times within said channels with said framing bit in a predetermined bit position, said words inserted together at each of said selected times forming a data point in a symmetrical subset of data points in a signal space diagram, all of the subset data points have said predetermined value in said predetermined bit position for each of said words inserted together, whereby the framing bit value is insensitive to the rotational effects of phase ambiguity.

2. The apparatus of claim 1 further comprising means (115, 116) for supplying utility bits to said forming means and each of said multibit words comprise at least one of said utility bits, whereby the power levels of the spectral tones generated by said multibit words is reduced.

3. The apparatus of claim 1 wherein predetermined ones of said formed multibit words comprise a quadrant bit having a predetermined value to resolve data regeneration errors caused by phase ambiguity.

4. The apparatus of claim 3 further comprising means (115, 116) for supplying utility bits to said forming means and said predetermined ones of said multibit words comprise said utility bits.

5. The apparatus of claim 1 wherein said forming means forms second multibit words each comprising a quadrant bit to resolve data regeneration errors caused by phase ambiguity and said inserting means inserts said second multibit words within said channels at other times.

6. The apparatus of claim 5 further comprising means (115, 116) for supplying utility bits to said forming means and each of said second multibit words comprise at least one of said utility bits.

7. The apparatus of claims 1, 2, 3, 4, 5 or 6 wherein said data is Gray-coded.

8. Apparatus for receiving a QAM signal comprising means (200) for demodulating said QAM signal and forming at least two channels of nondifferentially encoded data, said data being sensitive to rotational effects of phase ambiguity, said apparatus being characterized by means (217) for recovering framing by examining said channels at selected times to recover framing bits having predetermined values and being in predetermined bit positions within multibit words, said multibit words at each selected time being within a symmetrical subset of data points in a signal space diagram where all of the subset data points have said predetermined values within said predetermined bit positions, whereby the framing bit value is insensitive to the rotational effects of phase ambiguity.

9. The apparatus of claim 8 further comprising means (250) responsive to said framing means for extracting utility bits from said multibit words.

10. The apparatus of claim 8 further comprising means (215, 216) responsive to said framing means for examining quadrant bits within predetermined ones of said multibit words and correcting regeneration errors in said data caused by phase ambiguity.

11. The apparatus of claim 10 further comprising means (250) responsive to said framing means for extracting utility bits from said multibit words.

12. The apparatus of claim 8 further comprising means (215, 216) responsive to said framing means for examining quadrant bits within second multibit words and correcting regeneration errors caused by phase ambiguity.

13. The apparatus of claim 12 further comprising means (250) responsive to said framing means for extracting utility bits from said second multibit words.

14. The apparatus of claims 8, 9, 10, 11, 12 or 13 wherein said data formed is Gray-coded.

15. A QAM system comprising a transmitter in which at least two channels of nondifferentially encoded data modulate the amplitudes of quadrature related carriers to form the QAM signal and a receiver which demodulates the QAM signal and regenerates said data, said system being characterized by means (114, 115) in said transmitter for forming multibit words ($F_I, F_Q$) each comprising at least one framing bit having a predetermined value, means (108, 109, 110, 111, 112, 113, 115) for inserting said multibit words at selected times within said channels with said framing bit in a predetermined bit position, said words inserted together at each of said selected times forming a data point within a symmetrical subset of data points in a signal space diagram, all of the subset data points have said predetermined value in said predetermined bit position for each of said words inserted together so that the framing bit value is insensitive to rotational effects of phase ambiguity, and means in the receiver for examining said channels to locate said framing bit.

16. A method of maintaining frame synchronization in a QAM system comprising a transmitter in which at least two channels of data modulate the amplitudes of quadrature related carriers and a receiver which demodulates said carriers and regenerates said data, said method being characterized by forming words ($F_I, F_Q$) each comprising at least one framing bit having a predetermined value, inserting said multibit words at selected times within said channels with said framing bit in a predetermined bit position, said multibit words inserted together at each of said selected times forming a data point within a symmetrical subset of data points in a signal space diagram, all of the subset data points have said predetermined value in said predetermined bit position for each of said words inserted together so that the framing bit value is insensitive to rotational effects of phase ambiguity, and locating said framing bits in the receiver from said regenerated data.

* * * * *